US012391064B1

(12) United States Patent
Calvert

(10) Patent No.: US 12,391,064 B1
(45) Date of Patent: Aug. 19, 2025

(54) GEARED CHALK LINE

(71) Applicant: William Calvert, Lake Stevens, WA (US)

(72) Inventor: William Calvert, Lake Stevens, WA (US)

( * ) Notice: Subject to any disclaimer, the term of this patent is extended or adjusted under 35 U.S.C. 154(b) by 315 days.

(21) Appl. No.: 18/099,375

(22) Filed: Jan. 20, 2023

(51) Int. Cl.
*B44D 3/38* (2006.01)
*B65H 75/44* (2006.01)

(52) U.S. Cl.
CPC ........... *B44D 3/38* (2013.01); *B65H 75/4494* (2013.01); *B65H 2701/357* (2013.01)

(58) Field of Classification Search
CPC . B44D 3/38; B65H 75/4494; B65H 2701/357
See application file for complete search history.

(56) References Cited

U.S. PATENT DOCUMENTS 526,937 A * 10/1894 Neff ......................... B44D 3/38 33/414
627,057 A * 6/1899 Gavin ...................... B44D 3/38 33/414
754,827 A * 3/1904 Thompson ............... B44D 3/38 33/414
850,052 A * 4/1907 Reare ...................... B60R 22/44 242/375.3
1,219,473 A * 3/1917 Meldrum ................. B44D 3/38 33/414
1,555,167 A * 9/1925 Switzer .................... B44D 3/38 242/405
1,566,647 A * 12/1925 Bryan ...................... B44D 3/38 33/414
4,197,656 A * 4/1980 Lane ........................ B44D 3/38 33/414
4,565,011 A * 1/1986 Karger ..................... B44D 3/38 242/375
5,042,159 A * 8/1991 Millen ..................... B44D 3/38 242/375.3
5,822,874 A * 10/1998 Nemes ..................... B44D 3/38 33/413
5,920,997 A * 7/1999 Girtman ................... B44D 3/38 242/375.3
6,826,845 B2 * 12/2004 Pritchard ............. G01B 3/1084 33/760

(Continued)

FOREIGN PATENT DOCUMENTS

DE 20015210 U1 * 4/2001 ............... B44D 3/38

*Primary Examiner* — Yaritza Guadalupe-McCall
(74) *Attorney, Agent, or Firm* — Cramer Patent & Design, PLLC.; Aaron R. Cramer

(57) ABSTRACT

The present invention is directed to a geared chalk line preferably configured for a left-handed user. The geared chalk line may comprise an enclosure, a reel, a string line, a hook, a plurality of gears, and a crank. The geared chalk line may be a tool for striking a straight line across a work surface using chalk. The enclosure may comprise a chalk box and a gear box. The chalk box may house the reel and the chalk. The string line may be deployed from the reel for use. The plurality of gears may be configured for the crank to rewind the string line faster than if ungeared. The plurality of gears be housed in the gear box separate from the chalk such that the chalk does not impede the plurality of gears. The string line may be stretched across the work surface and snapped to deposit the chalk on the work surface.

1 Claim, 7 Drawing Sheets

(56) References Cited

U.S. PATENT DOCUMENTS

| | | | | |
|---|---|---|---|---|
| 6,895,679 | B2 * | 5/2005 | Dekort | B44D 3/38 33/767 |
| 6,931,742 | B1 * | 8/2005 | VanWinkle | B44D 3/38 242/390.8 |
| 7,200,949 | B2 | 4/2007 | Leslie et al. | |
| 7,311,283 | B2 * | 12/2007 | Whitney | B44D 3/38 242/395.1 |
| 7,331,116 | B1 * | 2/2008 | Johnston | B44D 3/38 33/764 |
| 7,334,344 | B2 | 2/2008 | Scarborough | |
| 7,478,484 | B2 * | 1/2009 | Nepil | B44D 3/38 242/407 |
| 7,536,799 | B2 * | 5/2009 | Nepil | B44D 3/38 33/414 |
| 7,536,800 | B2 * | 5/2009 | Nepil | B44D 3/38 33/414 |
| 7,624,509 | B2 * | 12/2009 | Hanson | B44D 3/38 33/414 |
| 7,681,826 | B2 * | 3/2010 | Whitney | B44D 3/38 242/395.1 |
| 7,707,734 | B2 * | 5/2010 | Alexander | B44D 3/38 33/1 LE |
| 7,913,409 | B2 | 3/2011 | Wilson | |
| 8,033,029 | B2 * | 10/2011 | Johnston | B44D 3/38 33/413 |
| 8,713,810 | B2 | 5/2014 | Spaulding | |
| 9,340,063 | B1 | 5/2016 | Hale | |
| 10,507,689 | B2 * | 12/2019 | Nosek | B44D 3/38 |
| 11,554,605 | B1 * | 1/2023 | Fox | B44D 3/38 |
| 11,801,708 | B2 * | 10/2023 | Cemke, Jr. | B44D 3/38 |
| 11,897,280 | B2 * | 2/2024 | Wilson | B44D 3/38 |
| 2003/0160122 | A1 * | 8/2003 | Girtman | B44D 3/38 242/396 |
| 2018/0065404 | A1 * | 3/2018 | Khangar | B44D 3/38 |

* cited by examiner

GEARED CHALK LINE

RELATED APPLICATIONS

Non-applicable.

FIELD OF THE INVENTION

The present invention relates to a chalk line and more specifically to a geared chalk line having a specific rotation.

BACKGROUND OF THE INVENTION

Construction projects require a variety of tools and accessories in order to ensure proper measurements for sizing pieces prior to performing cuts and/or assembly. As a result, there are a variety of core or base tools that are required when performing virtually any measuring or marking task and especially those tasks that require the determination of a perfectly level line or vertical line. One common tool found in almost every carpenter's toolbelt is that of a chalk line. They are used to mark absolutely straight lines over very long distances using a line or string that is impregnated with fine ground up chalk.

However, for as simple of a device as they are, they are not without problems. Such problems include a string line that does not hold adequate chalk, thus causing faint and hard-to-see lines, and a wind-up crank that takes forever to operate as well as being prone to binding up as chalk jams the crank mechanism. Accordingly, there exists a need for a means by which usage of chalk line can be enhanced to address the above-mentioned deficiencies and improve utilization of a chalk line. The development of the geared chalk line fulfills this need.

SUMMARY OF THE INVENTION

To achieve the above and other objectives, the present invention provides for a geared chalk line that is a tool that has an enclosure with a chalk box and a gear box. It houses a reel within the chalk box which contains a line of chalk, and a string line is wound around it. The string line has a hook on one end that is used to attach to a work surface and the other end is attached to the center of the reel. The tool also includes gears within the gear box and a crank that can be used to rewind the string line. The chalk box includes an aperture for inserting chalk and a separate aperture for the string line to pass through. The reel is mounted on an axle that is connected to gears which can be disengaged with a release tab. The axle passes through an aperture between the gear box and the chalk box.

The axle aperture may include a seal to prevent the chalk from entering the gear box from the chalk box. The string line may pass through the chalk as the string line enters the chalk box and the string line accumulates a coating of the chalk. The string line may be stretched across the work surface and snapped to deposit the chalk on the work surface. The string line may include a diamond braided cotton to increase the ability to carry the chalk. The gears may provide a mechanical speed advantage while rewinding the string line. The crank may be folded at a crank hinge for storage and unfolded for use. The crank may include a crank post that couple the crank to the gears to pass through the crank aperture. The crank may include a crank armature and a finger grip. The finger grip may be oriented to be perpendicular to the crank armature. The geared chalk line in a preferred embodiment is configured for operation by a left-handed user. The finger grip may be free to rotate as the crank is used.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
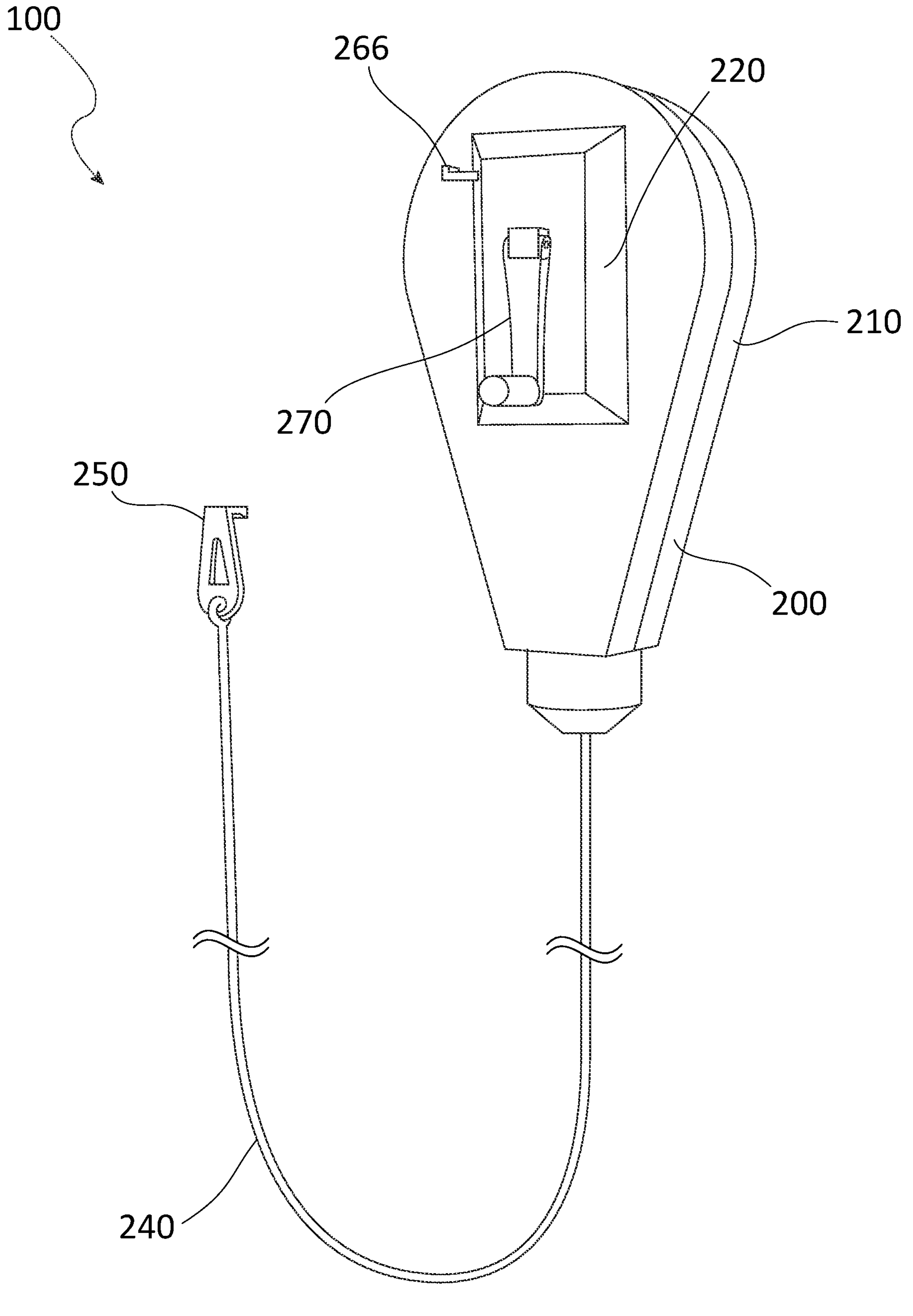
FIG. 1 is an isometric view of a geared chalk line, according to an embodiment of the present invention.
Figure 2:
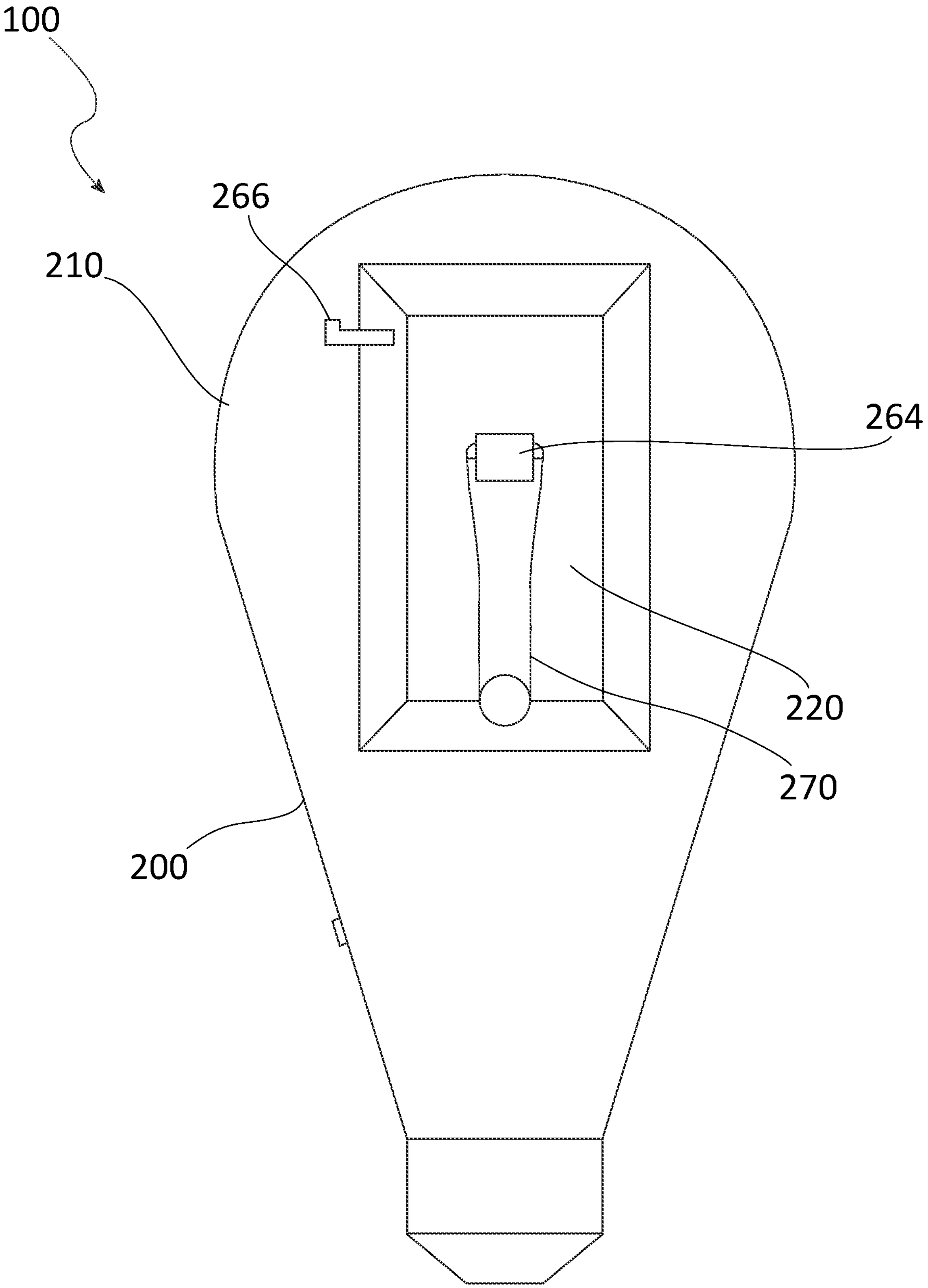
FIG. 2 is a left side view of a geared chalk line, according to an embodiment of the present invention.
Figure 3:
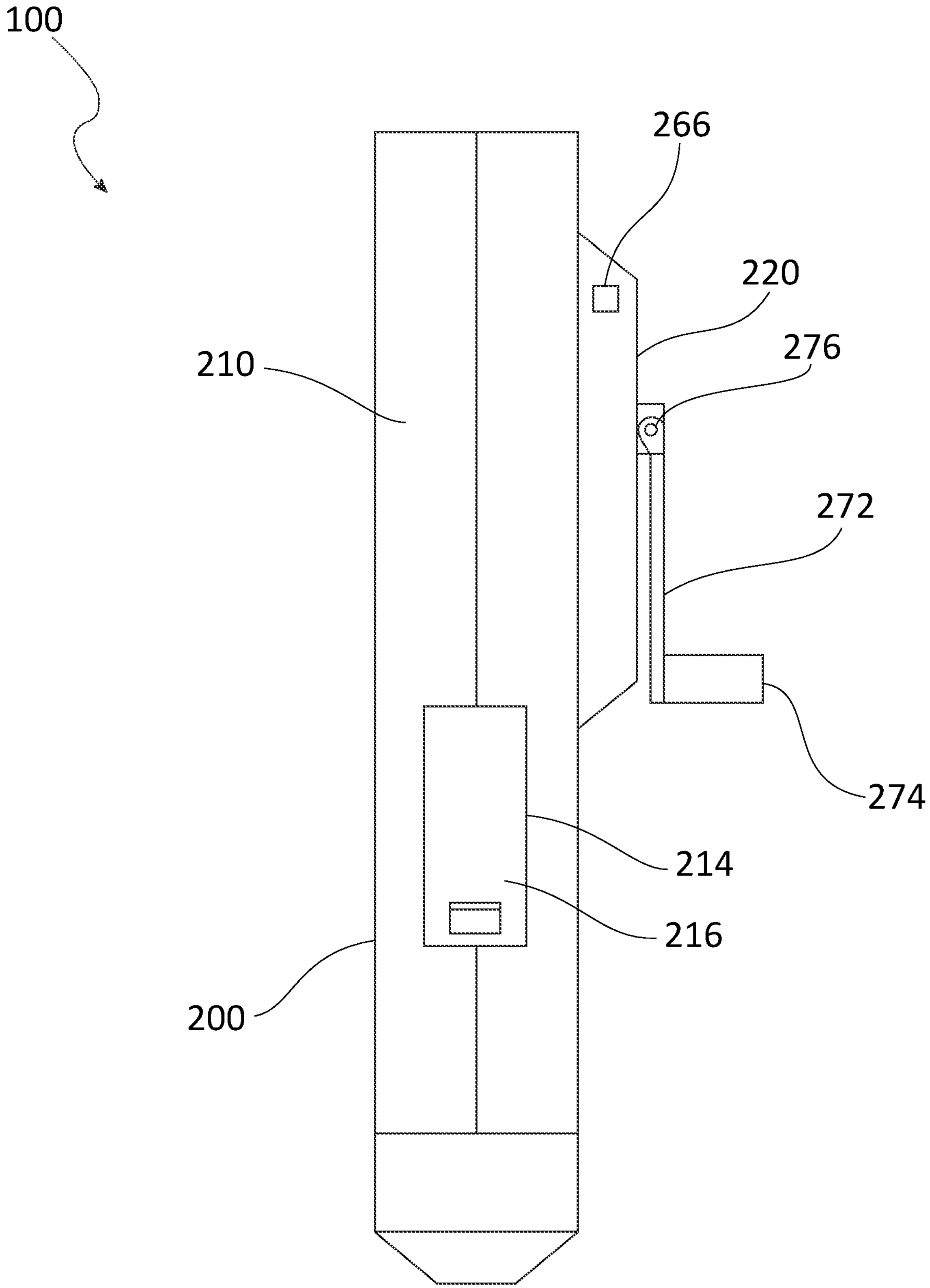
FIG. 3 is a front view of a geared chalk line, according to an embodiment of the present invention.
Figure 4:
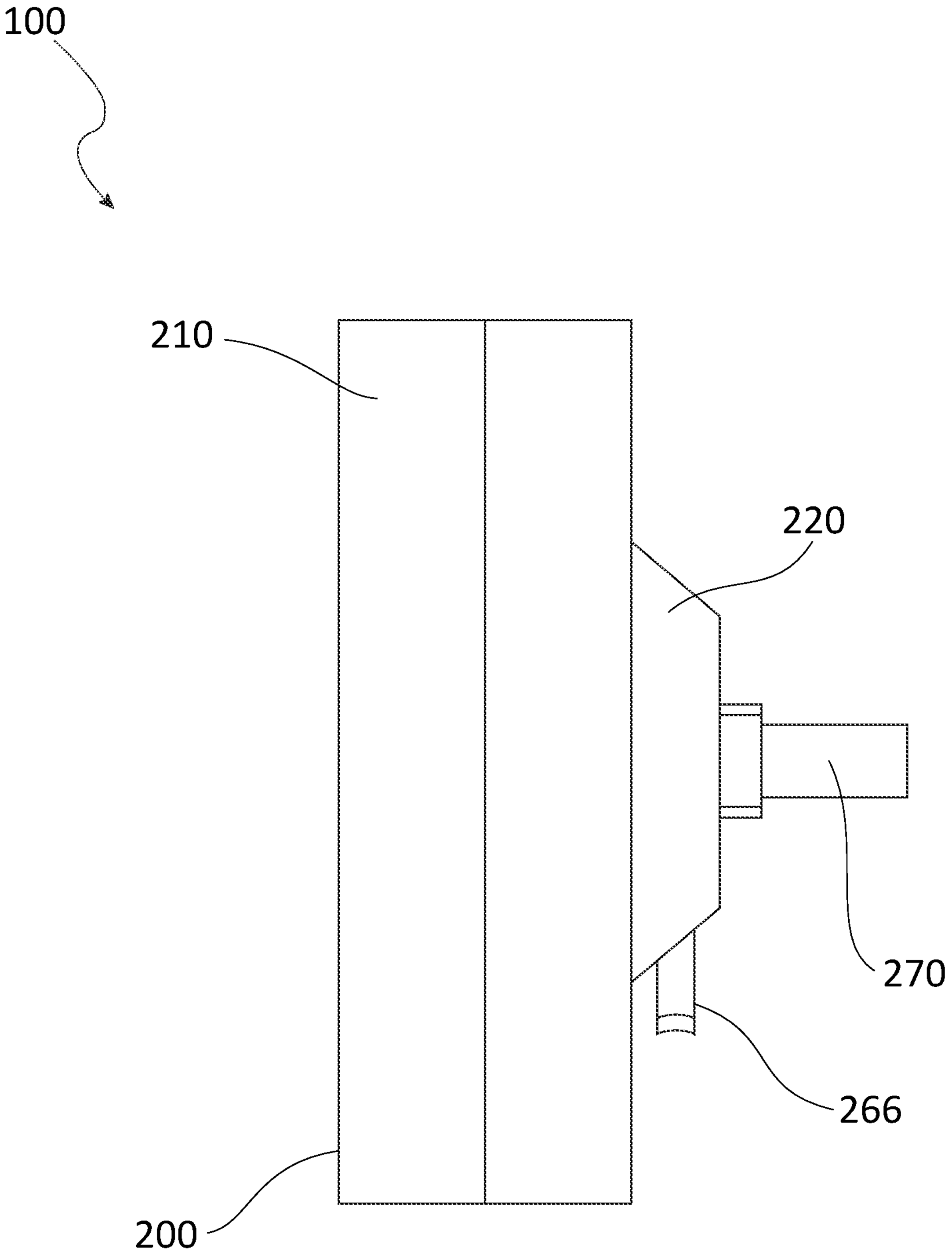
FIG. 4 is a top view of a geared chalk line, according to an embodiment of the present invention.
Figure 5:
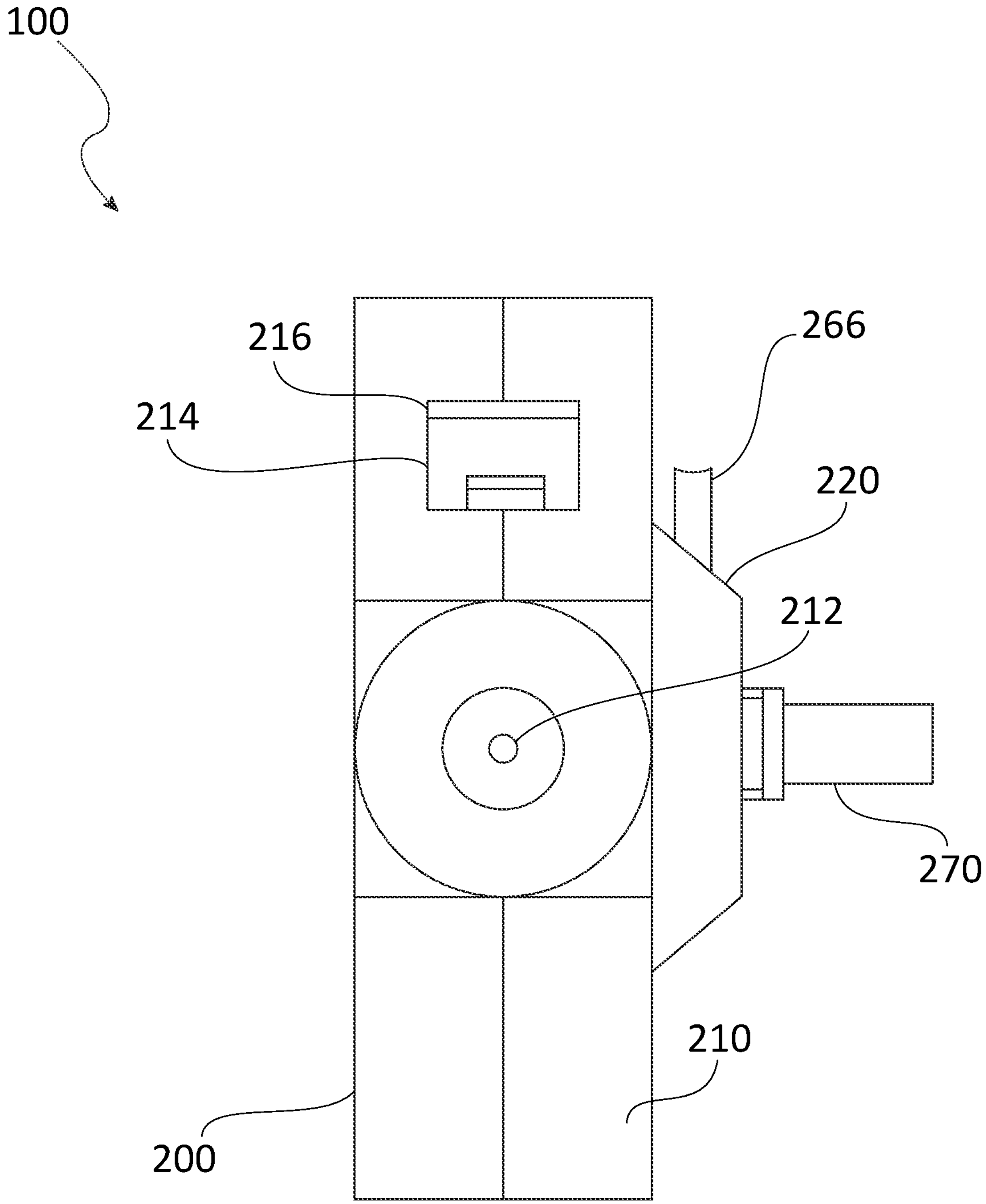
FIG. 5 is a bottom view of a geared chalk line, according to an embodiment of the present invention.
Figure 6:
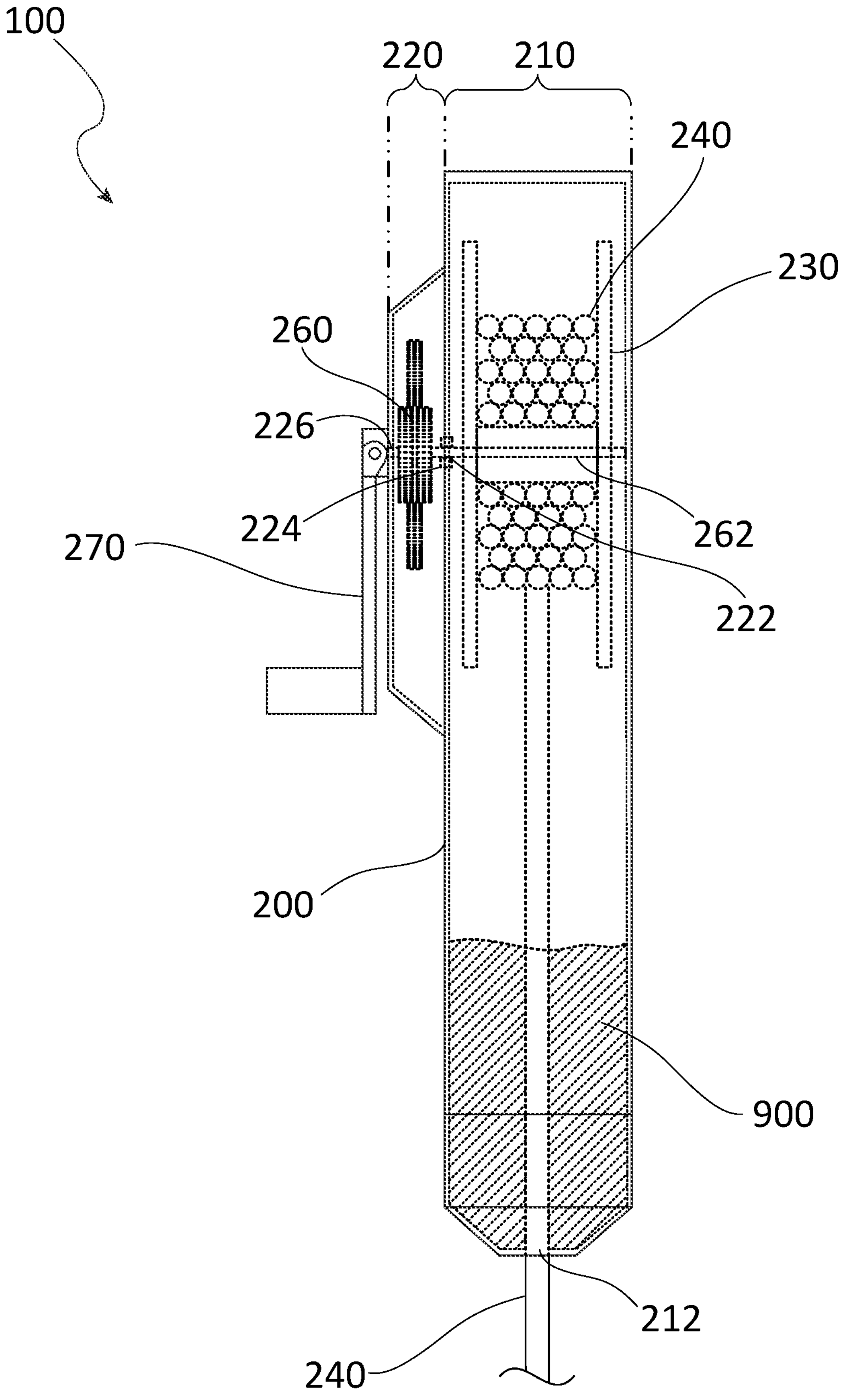
FIG. 6 is a rear view of a geared chalk line, according to an embodiment of the present invention.
Figure 7:
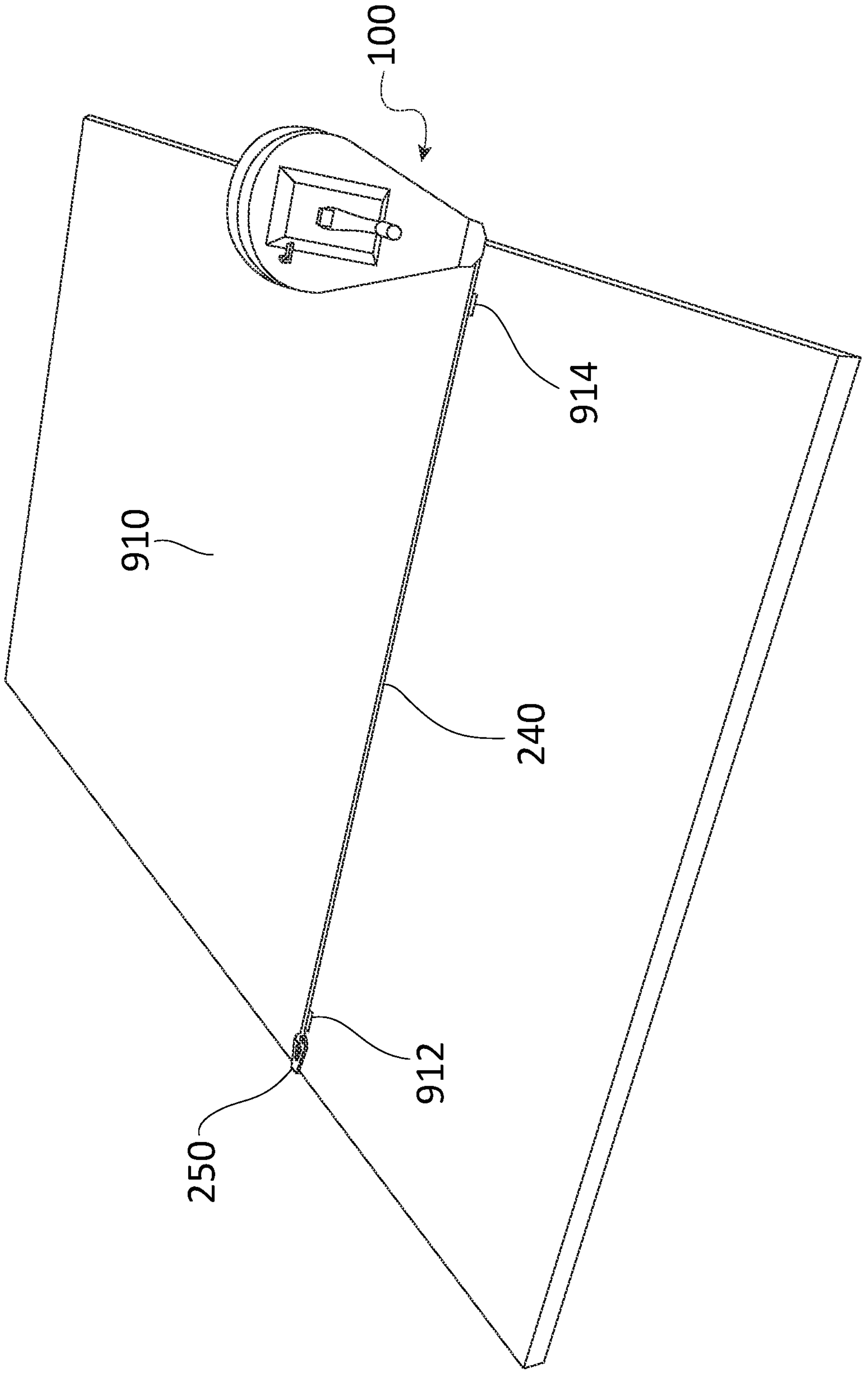
FIG. 7 is an in-use view of a geared chalk line, according to an embodiment of the present invention.

100 geared chalk line
200 enclosure
210 chalk box
212 line aperture
214 chalk aperture
216 door
220 gear box
222 axle aperture
224 seal
226 crank aperture
230 reel
240 string line
250 hook
260 gear
262 axle
264 crank post
266 release tab
270 crank
272 crank armature
274 finger grip
276 crank hinge
900 chalk
910 work surface
912 first mark
914 second mark

DESCRIPTION OF THE INVENTION

The present invention is directed to a geared chalk line (herein described as the "invention") 100. The invention 100 may comprise an enclosure 200, a reel 230, a string line 240, a hook 250, a plurality of gears 260, and a crank 270. The invention 100 may be a tool for striking a straight line across a work surface 910 using chalk 900. The enclosure 200 may comprise a chalk box 210 and a gear box 220. The chalk box 210 may house the reel 230 and the chalk 900. The string line 240 may be deployed from the reel 230 for use. The plurality of gears 260 may be configured for the crank 270 to rewind the string line 240 faster than if ungeared. The plurality of gears 260 can be housed in the gear box 220 separate from the chalk 900 such that the chalk 900 does not impede the plurality of gears 260. The string line 240 may be stretched across the work surface 910 and snapped to deposit the chalk 900 on the work surface 910.

The enclosure 200 may be a housing that may be divided into the chalk box 210 and the gear box 220. The chalk box 210 may hold the chalk 900 and the string line 240 wrapped around the reel 230. The reel 230 may be mounted on an axle 262 such that the reel 230 may revolve.

The chalk box 210 may comprise a chalk aperture 214 located on a side of the chalk box 210 through which the chalk 900 may be inserted into the chalk box 210. The chalk aperture 214 may be covered by a door 216. The door 216 may be opened to add the chalk 900 into the chalk box 210 and may be closed to retain the chalk 900 within the chalk box 210. In some embodiments, the door 216 may slide to open and close.

The chalk box 210 may comprise a line aperture 212 located at the bottom end of the chalk box 210 through which the string line 240 may enter and exit the chalk box 210. The string line 240 may pass through the chalk 900 as the string line 240 enters the chalk box 210, exits the chalk box 210, or both. As the string line 240 passes through the chalk 900, the string line 240 may accumulate a coating of the chalk 900. The string line 240 may mark the straight line onto the work surface 910 by depositing the chalk 900 from the string line 240 onto the work surface 910 when the string line 240 is stretched across the work surface 910 and snapped.

In some embodiments, the chalk box 210 may separate into two portions such that the reel 230 may be accessed for maintenance. As a non-limiting example, the chalk 900 may be emptied from the chalk box 210 and the chalk box 210 may be separated in order to access the reel 230 for replacement of the string line 240 when the string line 240 breaks.

The gear box 220 may house the plurality of gears 260. The axle 262 that passes through the reel 230 may be coupled to the plurality of gears 260. The axle 262 may pass through an axle aperture 222 between the gear box 220 and the chalk box 210. The axle aperture 222 may comprise a seal 224 to prevent the chalk 900 from entering the gear box 220 from the chalk box 210.

The gear box 220 may comprise a crank aperture 226. A crank post 264 that may couple the crank 270 to the plurality of gears 260 may pass through the crank aperture 226.

The string line 240 may be a flexible line that may be stretched across the work surface 910 and snapped in order to deposit the chalk 900 carried by the string line 240 onto the work surface 910. In some embodiments, the string line 240 may comprise a diamond braided cotton to increase the ability to carry the chalk 900.

The hook 250 may be a bent armature configured to detachably couple to the work surface 910. The distal end of the string line 240 may be coupled to the hook 250 such that the string line 240 may be stretched between the hook 250 at a first location on the work surface 910 and the line aperture 212 of the chalk box 210 at a second location on the work surface 910. The proximal end of the string line 240 may be coupled to the center of the reel 230.

The plurality of gears 260 may be adapted to provide a mechanical speed advantage to a user while rewinding the string line 240. The plurality of gears 260 may cause a single revolution of the crank 270 to produce more than one (1) revolution of the reel 230 when rewinding the string line 240. In some embodiments, a gear ratio measuring revolutions of the reel 230 for each revolution of the crank 270 may be between two-to-one (2:1) and eight-to-one (8:1). In a preferred embodiment, the gear ratio may be seven-point-one-to-one (7.1:1). As non-limiting examples, the plurality of gears 260 may comprise an epicyclic gear train, planetary gearset, ring gear, or any combination thereof.

The plurality of gears 260 may comprise a release tab 266 that may be accessible outside of the gear box 220. The release tab 266 may be operable to disengage the plurality of gears 260 from the axle 262 such that the axle 262 may turn freely. The release tab 266 may be automatically reset when the crank 270 is turned.

The crank 270 may be adapted to be turned by the user in order to rewind the string line 240. The crank 270 may comprise a crank armature 272 and a finger grip 274. The finger grip 274 may be oriented to be perpendicular to the crank armature 272 and the finger grip 274 may be free to rotate as the crank 270 is used. The crank 270 may hingedly couple to the crank post 264 via a crank hinge 276. The crank 270 may be folded at the crank hinge 276 for storage and unfolded for use. When unfolded, the finger grip 274 may point away from the enclosure 200 and may therefore be accessible for grasping. When folded, the finger grip 274 may point towards the enclosure 200 and may therefore reduce the overall dimensions of the invention 100.

In use, the chalk box 210 may be filled with chalk 900 through the chalk aperture 214 and the door 216 may be closed. The release tab 266 may be pressed to disengage the reel 230 from the plurality of gears 260 and the string line 240 may be pulled from within the chalk box 210. The hook 250 may be coupled to a first location on the work surface 910 and the string line 240 may be pulled across the work surface 910 such that the string line 240 passes over a first mark 912 and a second mark 914. The crank 270 may be turned to engage the plurality of gears 260 and stop the string line 240 from pulling out of the chalk box 210. The string line 240 may be stretched across the first mark 912 and the second mark 914 and then snapped to deposit the chalk 900 onto the work surface 910 under the string line 240. The user may turn the crank 270 to rewind the string line 240 onto the reel 230 and may fold the crank 270 for storage.

Although the illustration and depictions herein appear to refer to left-handed embodiments, it remains a scope of the invention to provide the teachings herein to provide embodiments that operate in right-handed operations.

The exact specifications, materials used, and method of use of the invention 100 may vary upon manufacturing. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A geared chalk line comprising:

an enclosure including a chalk box and a gear box separated from one another;

a reel mounted on an axle within the chalk box, the reel configured to revolve about the axle;

a string line wrapped around the reel, the string line comprising a diamond braided cotton material and extending through a line aperture in the chalk box;

a hook coupled to a distal end of the string line, the hook configured to detachably secure the string line to a work surface;

a crank coupled to the gear box, the crank comprising a crank armature, a crank hinge, and a finger grip oriented perpendicular to the crank armature, the finger grip being free to rotate as the crank is turned;

a plurality of gears housed within the gear box and operably coupled to the axle, wherein the plurality of gears provide a gear ratio between approximately two-to-one (2:1) and eight-to-one (8:1) such that a single revolution of the crank produces multiple revolutions of the reel;

a release tab positioned external to the gear box and operably connected to the plurality of gears, the release tab configured to selectively disengage the plurality of gears from the axle to permit the axle to rotate freely;

an axle aperture positioned between the chalk box and the gear box through which the axle passes, the axle aperture including a seal configured to prevent chalk from entering the gear box; and, a chalk aperture located on a side wall of the chalk box configured to receive chalk into the chalk box, the chalk aperture covered by a sliding door configured to open and close; and, wherein the string line passes through chalk housed in the chalk box to accumulate a coating of the chalk before exiting the chalk box, and wherein the crank is foldable about the crank hinge for storage.

* * * * *